(12) United States Patent
Yabe (10) Patent No.: US 11,050,641 B1
(45) Date of Patent: Jun. 29, 2021

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yoshiaki Yabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/029,076

(22) Filed: Sep. 23, 2020

(30) Foreign Application Priority Data

Feb. 10, 2020 (JP) .............................. JP2020-020533

(51) Int. Cl.
   *G06F 15/173* (2006.01)
   *H04L 12/24* (2006.01)

(52) U.S. Cl.
   CPC ...... *H04L 41/5038* (2013.01); *H04L 41/5003* (2013.01)

(58) Field of Classification Search
   CPC .................. H04L 41/5038; H04L 41/5003
   See application file for complete search history.

(56) References Cited

U.S. PATENT DOCUMENTS

| 10,469,330 | B1 * | 11/2019 | Roth | .................... | H04L 41/5003 |
| 2014/0129483 | A1 * | 5/2014 | Isaev | ....................... | G06Q 30/04 |
| | | | | | 705/400 |
| 2014/0244545 | A1 | 8/2014 | Tsuji | | |
| 2015/0254740 | A1 * | 9/2015 | Akolkar | ................ | B01F 3/1221 |
| | | | | | 705/34 |

(Continued)

FOREIGN PATENT DOCUMENTS

| JP | 2013-055696 | 3/2013 |
| JP | 2014167665 | 9/2014 |
| JP | 2017-174315 | 9/2017 |

OTHER PUBLICATIONS

Wang et al.; User adoption and purchasing intention after free trial: an empirical study of mobile newspapers; Aug. 8, 2012; Springer; 23 pages (Year: 2012).*

(Continued)

*Primary Examiner* — Richard G Keehn
(74) *Attorney, Agent, or Firm* — JCIPRNET (57) ABSTRACT

An information processing apparatus includes a processor configured to acquire a first usage of a first service by a user and a second usage of a second service in a first use mode in which the second service is trialed for free of charge by the user, the second service being associated with the first service, calculate, using the first usage and an amount of change in the usage of the first service, a first estimated usage of the first service by the user during a period after switching from the first use mode to a second use mode in which the second service is used for charge, the amount of change corresponding to use of the second service and being obtained based on the second usage in accordance with a defined relationship, and output information indicating a first estimated charge for the first service during the period and a second estimated charge for the second service during the period, the first estimated charge corresponding to the first estimated usage, the second estimated charge corresponding to the second usage.

20 Claims, 6 Drawing Sheets

| DATE AND TIME | USER ID | SERVICE ID | USAGE | TYPE |
|---|---|---|---|---|
| 09/01/2019 10:00 | user1 | SCAN SERVICE SET | 10 | TRIAL VERSION |
| 09/01/2019 11:00 | user2 | FIRST CLOUD STORAGE SERVICE | 20 | PRODUCT VERSION |
| ... | ... | ... | ... | ... |

136

(56) References Cited

U.S. PATENT DOCUMENTS

2018/0097643 A1* 4/2018 Raleigh .............. H04L 41/0806
2019/0372900 A1* 12/2019 Chen .................. H04L 41/5038

OTHER PUBLICATIONS

Cheng et al.; Optimal Software Free Trial Strategy: The Impact of Network Externalities and Consumer Uncertainty; Jun. 2012; Information Systems Research; vol. 23; pp. 488-504 (Year: 2012).*
Cheng et al.; Free trial or no free trail: Optimal software product design with network effects; 2010; Elsevier; European Journal of Operational Research 205; pp. 437-447 (Year: 2010).*
Pachidi et al.; Understanding users' behavior with software operation data mining; 2014; Elsevier; Computers in Human Behavior 30; pp. 583-594 (Year: 2014).*

* cited by examiner

| DATE AND TIME | USER ID | SERVICE ID | USAGE | TYPE |
|---|---|---|---|---|
| 09/01/2019 10:00 | user1 | SCAN SERVICE SET | 10 | TRIAL VERSION |
| 09/01/2019 11:00 | user2 | FIRST CLOUD STORAGE SERVICE | 20 | PRODUCT VERSION |
| ... | ... | ... | ... | ... |

| SERVICE ID | ASSOCIATED SERVICE ID | RATIO (%) |
|---|---|---|
| SCAN SERVICE SET (INCLUDING SCAN TO CLOUD) | CLOUD STORAGE SERVICE | 50 |
| | DOCUMENT MANAGEMENT SERVICE | 50 |
| | ... | ... |
| ... | ... | ... |

FIG. 5

| USER ID | USE INFORMATION | | |
| --- | --- | --- | --- |
| | CUSTOMER INFORMATION | CONTRACT INFORMATION | CONFIGURATION INFORMATION |
| user1 | ... | ... | ... |
| user2 | ... | ... | ... |
| ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-020533 filed Feb. 10, 2020.

BACKGROUND

(i) Technical Field

The present disclosure relates to an information processing apparatus and a non-transitory computer readable medium.

(ii) Related Art

There have been pay-as-you-go services in which users are charged according to usage. Regarding pay-as-you-go services, for example, a technique for calculating a charge, based on a use status of resources used by a target program, in a case where the target program is executed by a different information processing system is described in Japanese Unexamined Patent Application Publication No. 2017-174315. A technique for providing a service according to usage by calculating the usage by a user who runs software and uses it free of charge and placing restrictions on free use of the software once the usage exceeds a set value is described in Japanese Unexamined Patent Application Publication No. 2014-167665. A technique for obtaining the cumulative time during which a communication service is used by communicating means based on a normal billing system and displaying a change screen for prompting a change of a billing method in the case where the cumulative time exceeds a predetermined threshold time is described in Japanese Unexamined Patent Application Publication No. 2013-55696. Furthermore, a trial version allowing use for only a fixed period of time before use of a pay-as-you-go service may be provided. Such a trial version often places restrictions on, for example, the number of licenses and functions.

SUMMARY

Although use of the above-mentioned trial version is free of charge, use of a service is charged according to usage after switching from the trial version to a paid product version. However, before switching from the trial version to the product version, a user of the trial version does not know a charge for the service after switching to the product version. In particular, in the case where the user has already used a different service associated with this service, usage of the different service may change in accordance with switching from the trial version to the product version. In such a case, it is difficult to estimate correct charges for these services after switching from the trial version to the product version.

Aspects of non-limiting embodiments of the present disclosure relate to increasing the accuracy of estimated charges for a first service and a second service during a period after a use mode of the second service is changed, compared to a case where it is assumed that there is no change in the usage of the first service that has already been used between before and after the use mode of the second service is switched from free trial to paid use.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a processor configured to acquire a first usage of a first service by a user and a second usage of a second service in a first use mode in which the second service is trialed for free of charge by the user, the second service being associated with the first service, calculate, using the first usage and an amount of change in the usage of the first service, a first estimated usage of the first service by the user during a period after switching from the first use mode to a second use mode in which the second service is used for charge, the amount of change corresponding to use of the second service and being obtained based on the second usage in accordance with a defined relationship, and output information indicating a first estimated charge for the first service during the period and a second estimated charge for the second service during the period, the first estimated charge corresponding to the first estimated usage, the second estimated charge corresponding to the second usage.

BRIEF DESCRIPTION OF THE DRAWINGS

Exemplary embodiments of the present disclosure will be described in detail based on the following figures, wherein.

DETAILED DESCRIPTION

1. Configuration

Figure 1:
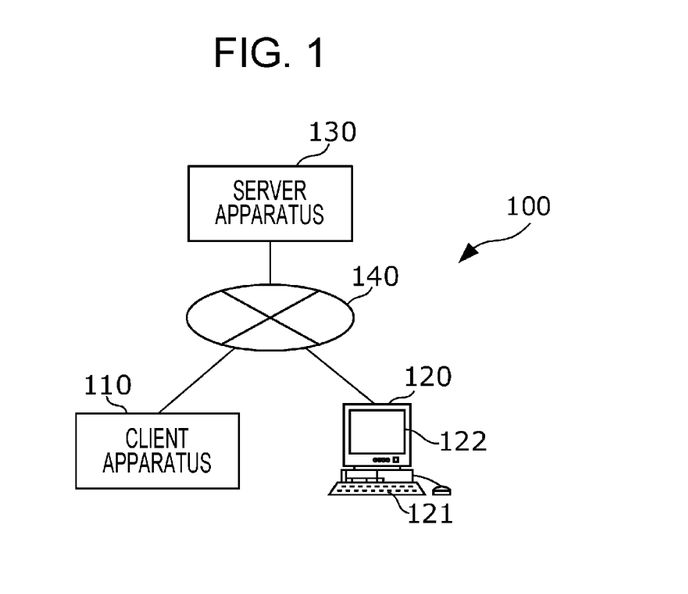
FIG. 1 is a diagram illustrating an example of a service providing system according to an exemplary embodiment.

FIG. 1 is a diagram illustrating an example of a service providing system 100 according to an exemplary embodiment. The service providing system 100 provides various services to users. The services include a pay-as-you-go service. A pay-as-you-go model represents a method for imposing a charge according to usage of a service. Furthermore, the service includes a product version providing the service for a charge and a trial version providing the service free of charge. The trial version is provided for the purpose of trial before purchase of the product version. The trial version and the product version are examples of a first use mode and a second use mode, respectively, in an exemplary embodiment of the present disclosure. Restrictions are imposed on use of the trial version. The restrictions include, for example, restrictions on the duration of use and the number of licenses. For example, in a trial version of a scan service set, the duration of use is restricted to one month, and the number of licenses is restricted to two users. In a trial version, a combination of a plurality of services may be used on a trial basis. For example, a trial version of a scan service set includes a plurality of services including a service called "scan to cloud". The service called "scan to cloud" is a service for transmitting scanned data to cloud. The service providing system 100 includes a client apparatus 110, a terminal apparatus 120, and a server apparatus 130. The client apparatus 110, the terminal apparatus 120, and the server apparatus 130 are connected to one another via a communication line 140.

The client apparatus 110 is used for providing a plurality of services. As the client apparatus 110, an image processing apparatus including multiple functions for processing images, such as a copy function, a print function, a scan function, and a facsimile function, may be used.

The terminal apparatus 120 is used by an administrator. The administrator operates the terminal apparatus 120 to receive data from the server apparatus 130 and output data to the server apparatus 130. A browser is installed in the terminal apparatus 120. The terminal apparatus 120 may receive data and output data using the browser. For example, the administrator operates the terminal apparatus 120 to apply a trial version or apply switching from the trial version to a product version. The terminal apparatus 120 includes an operation unit 121 and a display unit 122, in addition to a configuration similar to the configuration of the server apparatus 130, which will be described later. The operation unit 121 is used to operate the terminal apparatus 120. The operation unit 121 may include, for example, a mouse and a keyboard. The display unit 122 displays various types of information. The display unit 122 may be, for example, a liquid crystal display.

Figure 2:
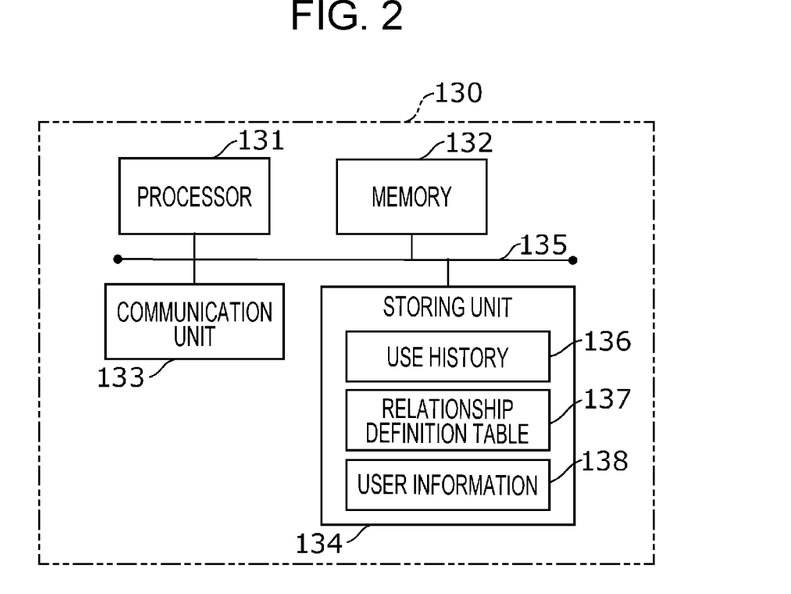
FIG. 2 is a diagram illustrating an example of the configuration of a server apparatus.

FIG. 2 is a diagram illustrating an example of the configuration of the server apparatus 130. The server apparatus 130 manages licenses of services. Furthermore, at the switching from a trial version to a product version, the server apparatus 130 calculates an estimated usage and an estimated charge for a service and provides the estimated usage and the estimated charge to the terminal apparatus 120. The server apparatus 130 is an example of an information processing apparatus according to an exemplary embodiment of the present disclosure. The server apparatus 130 includes a processor 131, a memory 132, a communication unit 133, and a storing unit 134. The processor 131, the memory 132, the communication unit 133, and the storing unit 134 are connected to one another via a bus 135.

The processor 131 executes a program to control the individual units of the server apparatus 130 or perform various types of processing. The processor 131 may be, for example, a central processing unit (CPU). The program to be executed by the processor 131 is stored in the memory 132. The memory 132 may be, for example, a read only memory (ROM) and a random access memory (RAM). The communication unit 133 performs data communication with external apparatuses connected to the server apparatus 130 via the communication line 140. Various data are stored in the storing unit 134. The storing unit 134 may be, for example, a hard disk drive or a solid state drive (SSD). A use history 136, a relationship definition table 137, and user information 138 are stored in advance in the storing unit 134.

Figure 3:
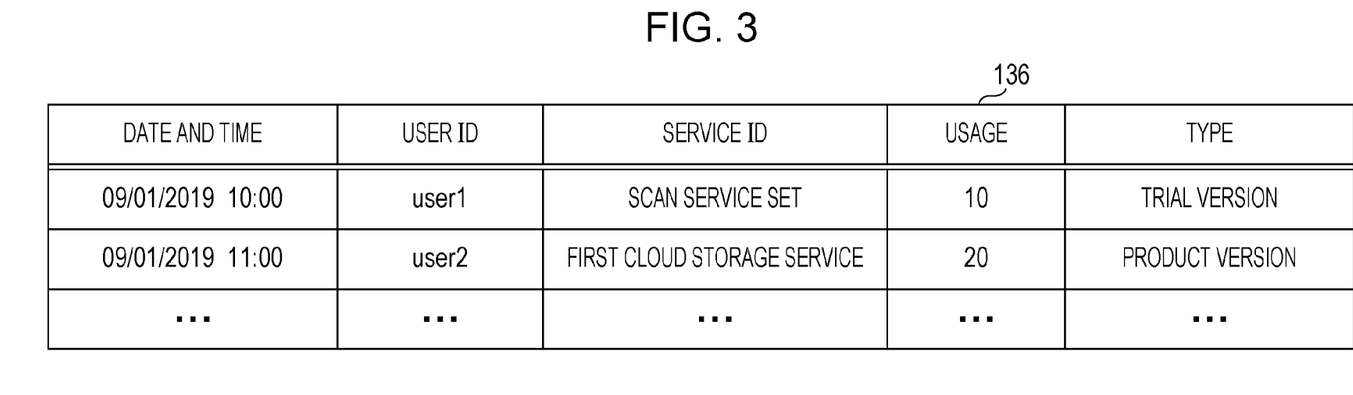
FIG. 3 is a diagram illustrating an example of a use history.

FIG. 3 is a diagram illustrating an example of the use history 136. The use history 136 represents history of use of a service by a user. The use history 136 includes a date and time, a user ID, a service ID, a usage, and a type. The date and time represents the date and time at which a user used a service. The user ID represents information for uniquely identifying a user. The user ID may be used for identifying each user or may be used for identifying each organization to which a plurality of users belong. The service ID represents information for uniquely identifying a service used by the user. The usage represents the usage of the service by the user. For example, in the case where a copy function is used, the usage may be the number of pages copied. In the case where a scan function is used, the usage may be the number of pages scanned. In the case where a plurality of services included in a set, such as a scan service set, are used, usage is calculated for each of the services. Usage of each of the services is calculated in accordance with a method set in advance for the service. Furthermore, in the case where a service has a plurality of licenses, the sum of usages of the licenses is used as the usage of the service. The type represents information indicating whether the service used by the user is a trial version or a product version. Every time that a user uses a service, the date and time at which the service was used, the user ID corresponding to the user, the usage of the service, the service ID corresponding to the service, and the type indicating whether the service is a trial version or a product version are stored in association with one another in the use history 136.

By aggregating the use history 136, usage of a service by each user in each month is obtained. For example, usage of a trial version of a scan service set by a user with a user ID "user1" is obtained by adding up usages associated with a set of the user ID "user1", a service ID "scan service set", and a type "trial version" in the use history 136. Furthermore, usage of a product version of a first cloud storage service by a user with a user ID "user2" in each month is obtained by adding up usages associated with a set of the user ID "user2", a service ID "first cloud storage service", and a type "product version" in the use history 136. The use history 136 may be aggregated at predetermined time intervals, and the aggregation result may be stored in the storing unit 134.

Figure 4:
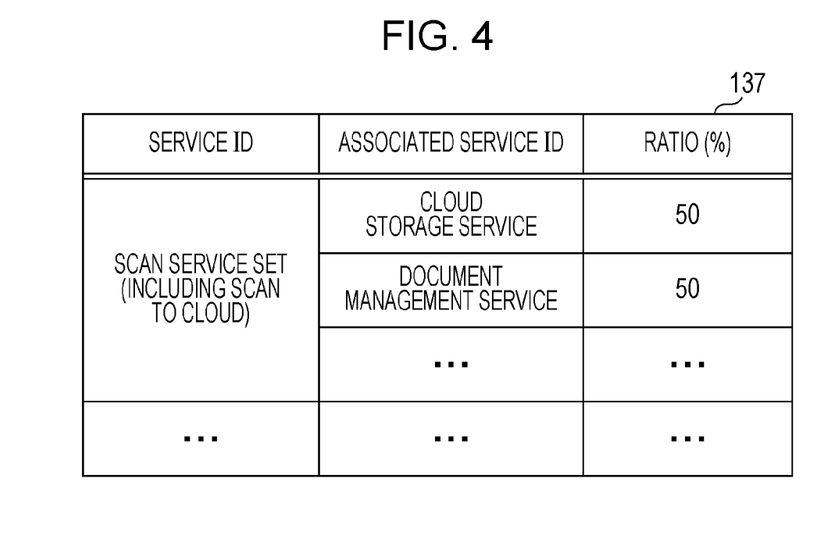
FIG. 4 is a diagram illustrating an example of a relationship definition table.

FIG. 4 is a diagram illustrating an example of the relationship definition table 137. Services provided using the client apparatus 110 include a service whose usage has an exclusive relationship or a dependent relationship with respect to usage of a specific service. For example, services provided by the service providing system 100 include a scan service set and a cloud storage service. As described above, the service called "scan to cloud" is a service for transmitting scanned data to cloud. The cloud storage service is a service for storing data on cloud. Thus, when the scan service set is used, usage of the cloud storage service increases as usage of the service called "scan to cloud" increases. In this case, it is assumed that the usage of the scan service set and the usage of the cloud storage service are dependent on each other. Furthermore, services provided by the service providing system 100 also include a document management service. The scan service set is a service for scanning an image and converting the scanned image into data. The document management service is a service for converting a format of data into a format desired by a user. Thus, when the scan service set is used, usage of the document management service increases as an amount corresponding to conversion into the format handled by the document management service, out of the usage of the scan service set, increases. In this case, it is assumed that the usage of the scan service set and the usage of the document management service are dependent on each other. The relationship definition table 137 represents the relationship between usage of a specific service and the amount of change in usage of a different service associated with the specific service according to use of the specific service. This relationship is defined in advance in accordance with contents of the specific service and contents of the different service associated with the specific service. The relationship definition table 137 includes a service ID, an associated service ID, and a ratio.

The service ID is information for uniquely identifying a service. The associated ID is information for uniquely identifying a different service associated with the service. The associated service represents a service whose usage varies according to use of a service with which the associated service is associated. For example, as described above, when the scan service set is used, usage of the cloud storage service increases as usage of "scan to cloud" included in the scan service set increases. In this case, services associated with the scan service set include the cloud storage service. Furthermore, when the scan service set is used, usage of the document management service increases as an amount corresponding to conversion into a format handled by the document management service, out of usage of the scan service set, increases. In this case, services associated with the scan service set include the document management service.

The ratio represents the ratio of the amount of change in usage of an associated service to usage of a service. That is, the ratio represents the relationship between usage of a service and the amount of change in usage of an associated service. For example, in the case where, when the scan service set is used, usage of the cloud storage service increases as usage of "scan to cloud" included in the scan service set increases, if the ratio of the usage of "scan to cloud" to the usage of the scan service set is assumed to be 50%, the ratio of the amount of change in the usage of the cloud storage service to the usage of the scan service set is 50%. Furthermore, for example, in the case where, when the scan service set is used, usage of the document management service increases as an amount corresponding to conversion into a format handled by the document management service, out of the usage of the scan service set, increases, if the ratio of the usage corresponding to the amount of conversion into the format to the usage of the scan service set is assumed to be 50%, the ratio of the amount of change in the usage of the document management service to the usage of the scan service set is 50%. This ratio may be set in advance. The ratio of the amount of change in the usage of the cloud storage service to the usage of the scan service set and the ratio of the amount of change in the usage of the document management service to the usage of the scan service set correspond to a first relationship and a second relationship, respectively, according to an exemplary embodiment of the present disclosure.

Figure 5:
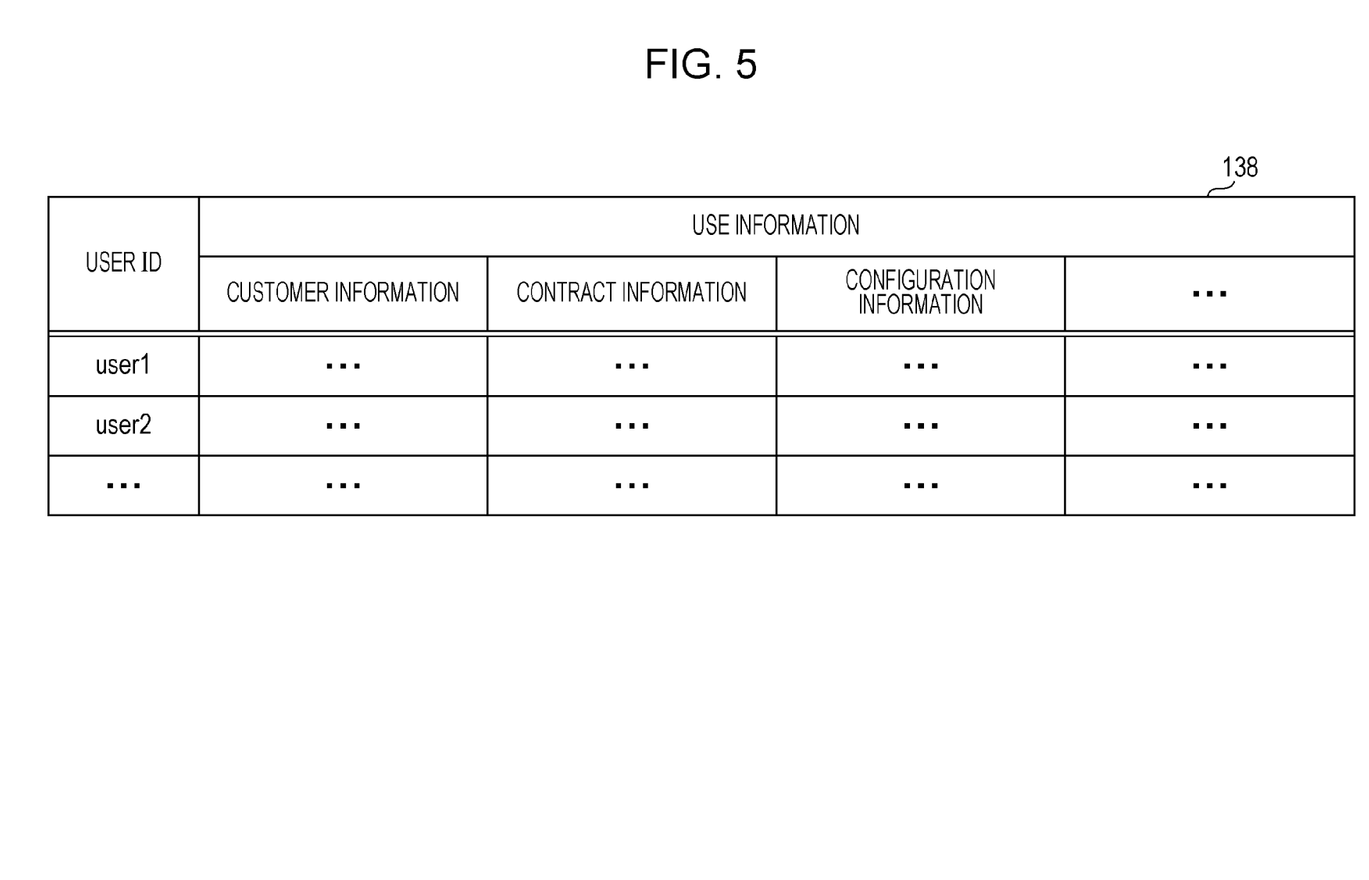
FIG. 5 is a diagram illustrating an example of user information.

FIG. 5 is a diagram illustrating an example of the user information 138. The user information 138 includes information of all the users who use a service. The user information 138 includes a user ID and use information. The use information of a user corresponding to a user ID is associated with the user ID. The user ID represents information for uniquely identifying a user. The user ID may be used for identifying each user or may be used for identifying each organization to which a plurality of users belong. The use information represents information indicating the use status of a service. The use information includes customer information, contract information, and configuration information. The customer information represents information indicating an attribute of the user. For example, in the case where the user belongs to a company, the customer information includes information indicating the size of the company, such as the number of employees. The contract information represents information indicating a service for which a user signs a use contract and a use condition for the service. The service for which the user signs the use contract represents the service being used by the user. The configuration information represents information indicating a configuration of the client apparatus 110 that is able to be used by the user. The configuration information may include, for example, the model number of the client apparatus 110 or a version of software installed in the client apparatus 110.

2. Operation

Figure 6:
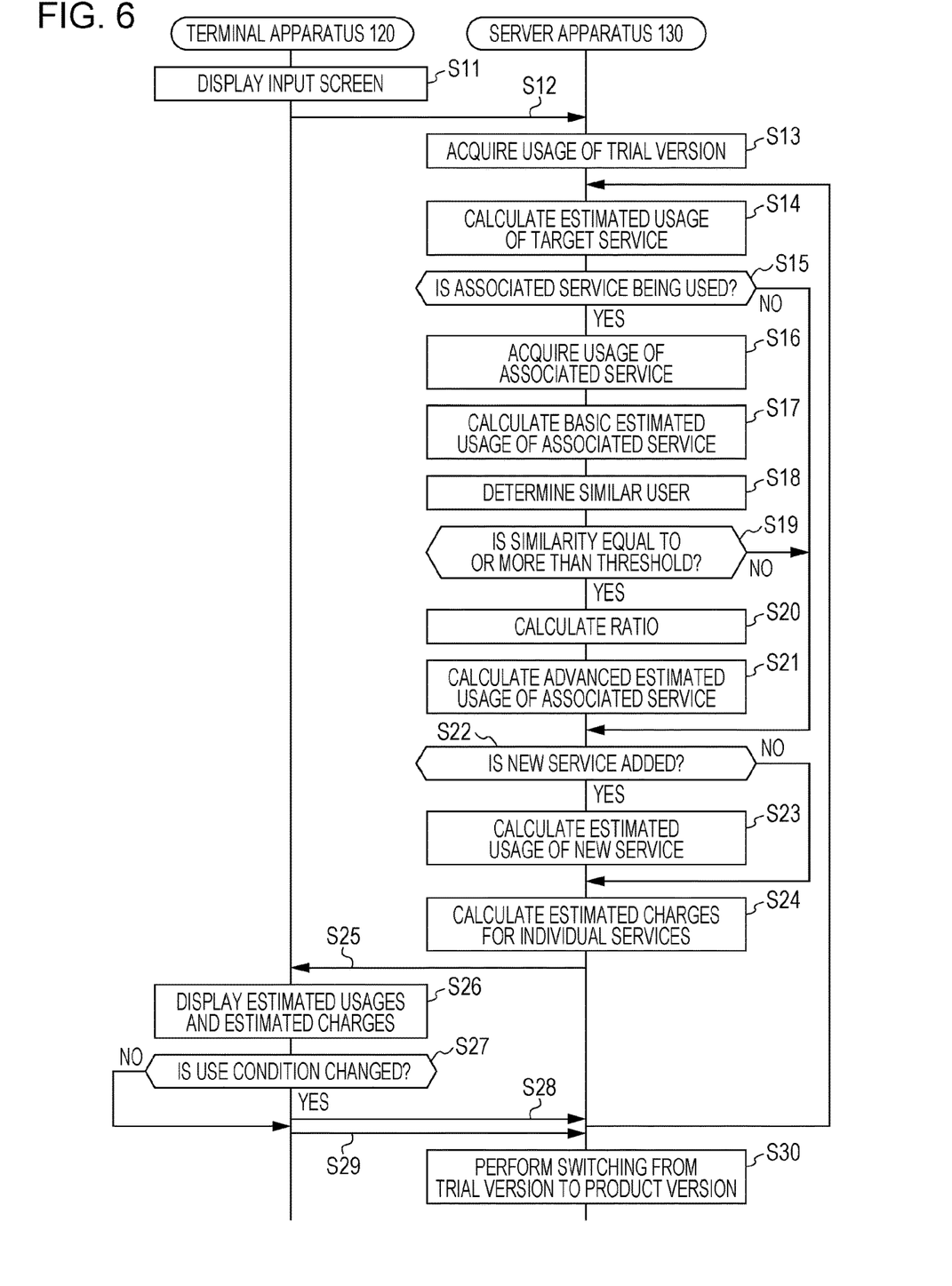
FIG. 6 is a sequence chart illustrating an example of operation of a service providing system.

FIG. 6 is a sequence chart illustrating an example of an operation of the service providing system 100. Hereinafter, in the case where the processor 131 is described as a subject of a process, the process is performed by the processor 131 performing calculation or controlling operation of other hardware elements in cooperation between the program stored in the memory 132 and the processor 131 executing the program. The operation illustrated in FIG. 6 is performed, for example, when a user (hereinafter, referred to as a target user) performs switching from a trial version to a product version while using a service (hereinafter, referred to as a target service) of the trial version. The target service is an example of a second service according to an exemplary embodiment of the present disclosure.

In step S11, the terminal apparatus 120 displays an input screen on the display unit 122. The input screen is used for inputting a use condition for a service. The input screen may be, for example, a purchase screen to be used for purchasing a service. Use conditions include, for example, the number of licenses and a configuration of options. An administrator corresponding to the target user operates the operation unit 121 to perform an operation for inputting a use condition on the input screen. For example, in the case where a use condition for the target service is changed at the switching from the trial version to the product version, a changed use condition for the target service is input on the input screen. Furthermore, in the case where use of a new service is desired to be started at the switching from the trial version to the product version of the target service, a use condition for the new service is input on the input screen.

In step S12, the terminal apparatus 120 transmits the use condition input in accordance with the operation by the administrator to the server apparatus 130. The use condition includes the user ID of the target user. The communication unit 133 of the server apparatus 130 receives the use condition transmitted from the terminal apparatus 120. The processor 131 acquires the use condition.

In step S13, the processor 131 acquires usage of the trial version of the target service by the target user in accordance with the use history 136 stored in the storing unit 134. The usage of the trial version of the target service is an example of a second usage according to an exemplary embodiment of the present disclosure.

In step S14, the processor 131 calculates an estimated usage of the target service by the target user during a unit period after the target service is changed from the trial version to the product version. The unit period is, for example, one month. The estimated usage of the product version of the target service is an example of a "second estimated usage" according to an exemplary embodiment of the present disclosure.

First, an example of a method for calculating the estimated usage of the product version of the target service in the case where the number of licenses is different between the trial version and the product version of the target service, will be explained. In this method, the estimated usage is calculated based on the usage of the trial version of the target service, in accordance with the relationship between the number of licenses of the trial version of the target service and the number of licenses of the product version of the target service. The number of licenses of the trial version of the target service is set in advance. The number of licenses of the product version of the target service is included in the use condition received from the terminal apparatus 120. As the usage of the trial version of the target service, the usage acquired in step S13 described above is used.

For example, in the case where the number of licenses of the trial version is two users, the number of licenses of the product version is 20 users, and the usage of the trial version is 1,000 pages, the estimated usage of the target service is calculated as 10,000 pages, in accordance with Equation (1).

$$\text{Estimated usage} = \frac{20}{2} \times 1000 \quad (1)$$

Next, another example of a method for calculating the estimated usage of the product version of the target service in accordance with history of usages of the target service by all users, in the case where the number of licenses is different between the trial version and the product version of the target service, will be explained. In this example, the estimated usage is calculated based on usage of the target service per unit period by all users, in accordance with the relationship between the number of licenses of the product version of the target service and the number of licenses of the target service owned by all the users. All the users include at least one different user who is different from the target user. The number of licenses of the product version of the target service is included in the use condition received from the terminal apparatus 120. The number of licenses of the target service owned by all the users is acquired from the user information 138 stored in the storing unit 134. The usage of the target service per unit period by all the users is acquired based on the use history 136 stored in the storing unit 134. The number of licenses of the product version of the target service and the number of licenses of the target service owned by all the users are examples of a first use condition and a second use condition, respectively, according to an exemplary embodiment of the present disclosure.

For example, in the case where the number of licenses of the product version of the target service is 20 users, usage of the target service per unit period by all the users is 50,000 pages, and the number of licenses of the target service owned by all the users is 100, the estimated usage of the target service is calculated as 10,000 pages in accordance with Equation 2.

$$\text{Estimated usage} = 20 \times \frac{50000}{100} \quad (2)$$

In step S15, the processor 131 determines, based on the relationship definition table 137 and the user information 138 stored in the storing unit 134, whether or not the target user is using a product version of an associated service that is associated with the target service. The associated service is an example of a first service according to an exemplary embodiment of the present disclosure. In this example, it is assumed that the target service is the scan service set. The relationship definition table 137 illustrated in FIG. 4 indicates that associated services of the scan service set include the cloud storage service and the document management service. For example, in the case where the user information 138 illustrated in FIG. 5 indicates that the target user is using a product version of a first cloud storage service and a product version of a second scan service set, the result of the determination in step S15 is YES, and the process proceeds to step S16. Hereinafter, simple terms "first cloud storage service" and "second cloud storage service" represent product versions of the corresponding services. In contrast, in the case where the relationship definition table 137 indicates that there is no service associated with the target service or the user information 138 indicates that the target user is not using a service associated with the target service, the result of the determination in step S15 is NO, and the process skips steps S16 to S21 and proceeds to step S22.

In step S16, the processor 131 acquires usage of associated services by the target user in accordance with the use history 136 stored in the storing unit 134. In this example, the associated services are the first cloud storage service and the second cloud storage service. In this case, usages of the first cloud storage service and the second cloud storage service by the target user are acquired on the basis of the use history 136. Usage of an associated service is an example of a first usage according to an exemplary embodiment of the present disclosure.

In step S17, the processor 131 calculates, using the relationship definition table 137 stored in the storing unit 134, basic estimated usages of the associated services by the target user during a unit period after the target service is switched from the trial version to the product version. An estimated usage of an associated service is an example of a first estimated usage according to an exemplary embodiment of the present disclosure.

For example, an estimated usage of an associated service is calculated on the basis of the latest usage of the associated service and the amount of change in the usage of the associated service at the switching from the trial version to the product version of the target service. The amount of change is obtained on the basis of the estimated usage of the target service in accordance with the relationship indicated by the relationship definition table 137 between the usage of the trial version of the target service and the amount of change in the usage of the associated service. The estimated usage calculated in step S14 is used as the estimated usage of the target service. For example, in the case where the trial version of the target service is used in August, the usage in August out of the usage of the associated service acquired in step S16 is used as the latest usage of the associated service by the target user.

In this example, the target service is the scan service set, and the associated services are the first cloud storage service and the second cloud storage service. The relationship definition table 137 illustrated in FIG. 4 indicates that the ratio of the amount of change in the usage of the cloud storage service to the usage of the scan service set is 50% (that is, 0.5). For example, in the case where the latest usage of the first cloud storage service is 90 GB and the estimated usage of the target service is 10 GB, the estimated usage of the first cloud storage service during the unit period is calculated as 94.5 GB in accordance with Equation (3-1). Furthermore, in the case where the latest usage of the second cloud storage service is 10 GB and the estimated usage of the target service is 10 GB, the estimated usage of the second cloud storage service during the unit period is calculated as 10.5 GB in accordance with Equation (3-2). The ratio of the latest usage of the first cloud storage service to the latest usage of the second cloud storage service is 9 to 1 (that is, 0.9 to 0.1).

$$\text{Estimated usage of first cloud storage service} = 90 + (10 \times 0.5 \times 0.9) \quad (3\text{-}1)$$

$$\text{Estimated usage of second cloud storage service} = 10 + (10 \times 0.5 \times 0.1) \quad (3\text{-}2)$$

In step S18, the processor 131 determines, based on the use history 136 and the user information 138 stored in the storing unit 134, a similar user whose use status is similar to the target user out of all the users. For example, use information of the target user and a different user is acquired from the user information 138 stored in the storing unit 134. The use information of the target user and the use information of the different user are examples of first use information and second use information, respectively, according to an exemplary embodiment of the present disclosure. Then, the similarity in the size of companies, contents of services being used, and the configuration of the client apparatuses 110 represented by the use information between the target user and the different user is obtained. The similarity may be obtained using artificial intelligence. For example, machine learning on the use information of the target user is performed, and a model is generated. By inputting the use information of the different user into the model, the similarity between the target user and the different user may be obtained. Deep learning may be used as a method for machine learning. Thus, a similar user is determined according to the similarity. For example, a different user with a similarity equal to or more than a threshold may be determined to be a similar user. Furthermore, a predetermined number of different users with high similarities may be determined to be similar users. Moreover, individual different users with the highest similarities with regard to the size of companies, contents of services being used, and the configuration of the client apparatuses 110 and a different user with the highest similarities with regard to all of the above items may be determined to be similar users. Such a similar user is an example of a reference person according to an exemplary embodiment of the present disclosure.

In step S19, the processor 131 determines whether or not the similarity of the similar user determined in step S18 is equal to or more than a threshold. In the case where the similarity is equal to or more than the threshold, the result of the determination in step S19 is YES, and the process proceeds to step S20. In contrast, in the case where the similarity is less than the threshold, the process skips steps S20 and S21 and proceeds to step S22.

In step S20, the processor 131 calculates, based on history of usage by the similar user, the ratio of the amount of change in the usage of the associated service to the usage of the trial version of the target service. At this time, a plurality of ratios may be calculated on the basis of histories of usages by a plurality of similar users. In this example, it is assumed that the target service is the scan service set, and the associated services are the first cloud storage service and the second cloud storage service. For example, usage of the scan service set by the similar user per unit period is obtained on the basis of the use history 136 stored in the storing unit 134. Then, usage of the service called "scan to cloud" or the amount of increase in usages of the first cloud storage service and the second cloud storage service during a unit period after the scan service set is switched from the trial version to the product version is obtained on the basis of the use history 136 stored in the storing unit 134. The amount of increase is obtained by, for example, obtaining a difference between the usages of the first cloud storage service and the second cloud storage service during the unit period immediately before the scan service set is switched from the trial version to the product version and the usages of the first cloud storage service and the second cloud storage service during the unit period immediately after the scan service set is switched from the trial version to the product version. Thus, the ratio of the usage of the service called "scan to cloud" or the amount of increase in the usages of the first cloud storage service and the second cloud storage service to the usage of the scan service set is obtained. The obtained ratio is used as the ratio of the amount of change in the usage of the associated service to the usage of the trial version of the target service.

In step S21, the processor 131 calculates an advanced estimated usage of the associated service by the target user the unit period after the target service is switched from the trial version to the product version. The ratio calculated in step S20 described above is used for calculation of the advance estimated usage. For example, by using the ratio calculated in step S20 described above, in place of the ratio included in the relationship definition table 137, in Equations (3-1) and (3-2) described above, the estimated usage of the associated service per unit period is obtained. At this time, in the case where a plurality of ratios are calculated in step S20, a plurality of estimated usages may be calculated on the basis of the plurality of ratios.

In step S22, the processor 131 determines whether or not a product version of a new service associated with the target service is added. The new service is an example of a third service according to an exemplary embodiment of the present disclosure. Hereinafter, a simple term "new service" represents a product version of a new service. For example, in the case where use conditions include a use condition for a new service, the result of the determination in step S22 is YES, and the process proceeds to step S23. In contrast, for example, in the case where use conditions do not include a use condition for a new service, the result of the determination in step S22 is NO, and the process skips step S23 and proceeds to step S24.

In step S23, the processor 131 calculates, based on the relationship definition table 137 stored in the storing unit 134, an estimated usage of the new service by the target user during the unit period after the target service is switched from the trial version to the product version. For example, the estimated usage of the new service is calculated, based on the estimated usage of the target service, in accordance with the relationship between the number of licenses of the trial version of the target service and the number of licenses of the new service, on the basis of the relationship between the usage of the target service and the amount of change in the usage of the new service indicated in the relationship definition table 137. The estimated usage calculated in step S14 described above is used as the estimated usage of the target service. The number of licenses of the trial version of the target service is set in advance. The number of licenses of the new service is included in the use condition received from the terminal apparatus 120. The estimated usage of the new service is an example of a third estimated usage according to an exemplary embodiment of the present disclosure.

In this example, it is assumed that the target service is the scan service set, and the new service is the document management service. The relationship definition table 137 illustrated in FIG. 4 indicates that the ratio of the amount of change in the usage of the document management service to the usage of the scan service set is 50% (that is, 0.5). For example, in the case where the estimated usage of the scan service set is 20,000 pages, the number of licenses of the trial version of the scan service set is 20 users, and the number of licenses of the new service is 10 users, the estimated usage of the new service is calculated as 5,000 pages in accordance with Equation (4).

$$\text{Estimated usage} = 20000 \times \frac{10}{20} \times 0.5 \qquad (4)$$

In step S24, the processor 131 calculates estimated charges for the target service, the associated service, and the new service on the basis of the estimated usages of the target service, the associated service, and the new service during the unit period after the target service is switched from the trial version to the product version. In the case where the estimated usage of the associated service or the new service is not calculated, the estimated charge for the associated service or the new service is not calculated. A method for calculating a charge according to usage is set in advance for each service. Charges according to the usages of the individual services are calculated in accordance with the corresponding calculation methods. Furthermore, in the case where the processing of step S21 described above is performed, as the estimated charge for the associated service, both the estimated charge according to the basic estimated usage calculated in step S17 describe above and the estimated charge according to the advanced estimated usage calculated in step S21 described above are calculated. Furthermore, in the case where estimated charges for a plurality of services are calculated, the sum of the estimated charges per unit period is also calculated. The estimated charge for the associated service, the estimated charge for the target service, and the estimated charge for the new service are examples of a first estimated charge, a second estimated charge, and a third estimated charge according to an exemplary embodiment of the present disclosure.

In step S25, the processor 131 transmits the estimated usages of the target service, the associated service, and the new service during the unit period after the target service is switched from the trial version to the product version and the estimated charges for the target service, the associated service, and the new service to the terminal apparatus 120. Accordingly, the estimated usages and the estimated charges are output. Furthermore, in the case where the target user is using the associated service, history of usages of the associated service is also acquired from the use history 136 stored in the storing unit 134 and is transmitted to the terminal apparatus 120. In the case where the estimated usage and the estimated charge for the associated service or the new service are not calculated, the estimated usage and the estimated charge for the associated service or the new service are not transmitted to the terminal apparatus 120. The terminal apparatus 120 receives information of the estimated usages and the estimated charges transmitted from the server apparatus 130.

In step S26, the terminal apparatus 120 displays on the display unit 122 the estimated usages and the estimated charges received from the server apparatus 130. The estimated usages and the estimated charges may be displayed on the same screen or may be displayed on different screens. In the case where the estimated usages and the estimated charges are displayed on different screens, these screens may be displayed in a switching manner in accordance with an operation by an administrator using the operation unit 121.

Figure 7:
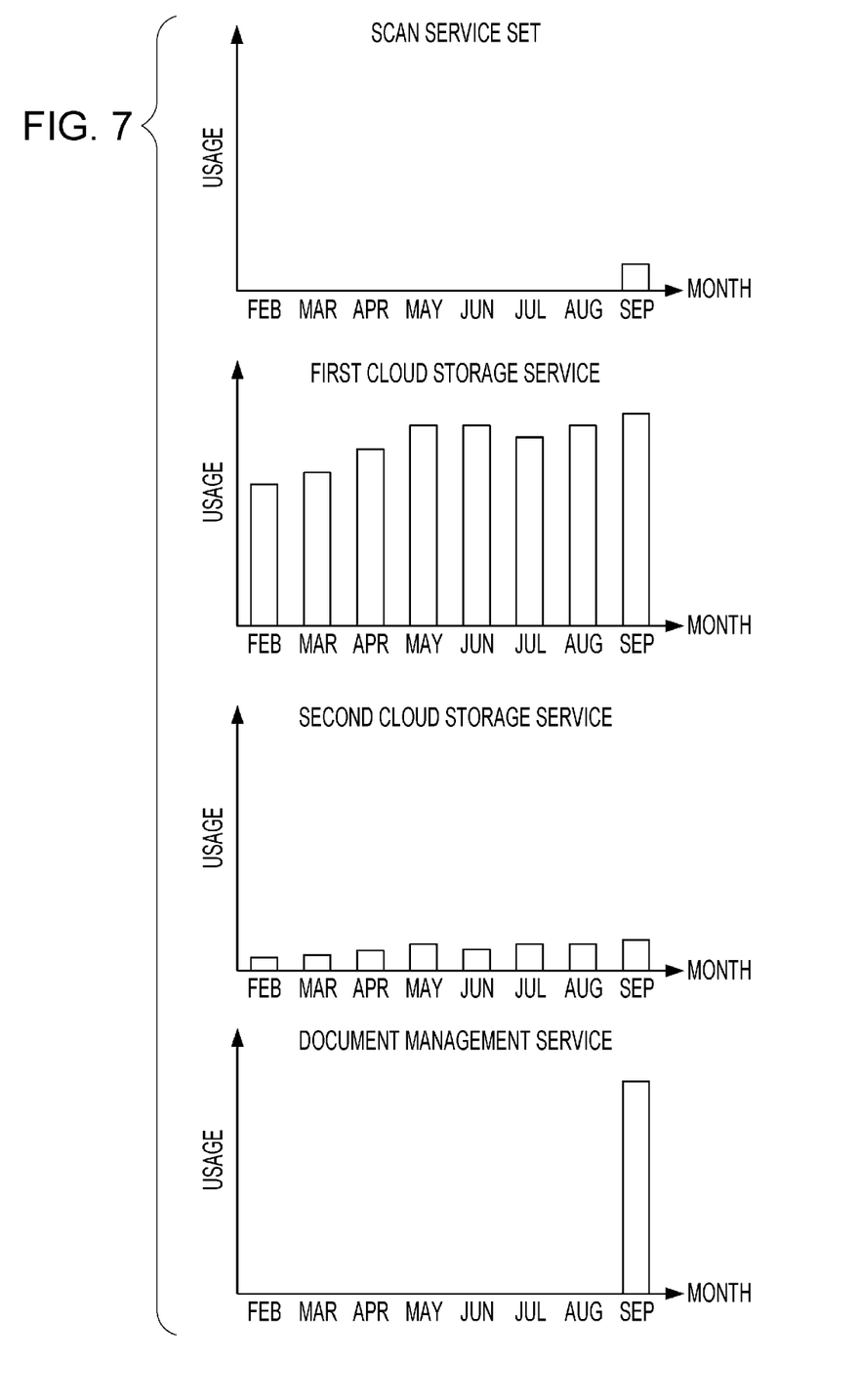
FIG. 7 is a diagram illustrating an example of estimated usages displayed on a display unit.

FIG. 7 is a diagram illustrating an example of estimated usages displayed on the display unit 122. In this example, bar graphs indicating at least one of actual usages and estimated usages of individual services are displayed. In this example, it is assumed that the target service is the scan service set, the associated services are the first cloud storage service and the second cloud storage service, and the new service is the document management service. The unit period is one month. The trial version of the scan service set is used in August.

Regarding the scan service set, the trial version is used in August, and nothing is used before August. Thus, no bar graph indicating usage before September is displayed, and only a bar graph indicating an estimated usage for September is displayed. The bar graph indicating the estimated usage of the target service for September is created in accordance with the estimated usage calculated in step S14 described above. Regarding the first cloud storage service and the second cloud storage service, bar graphs indicating usages in February to August and bar graphs indicating estimated usages for September are displayed. The bar graphs indicating the usages of the first cloud storage service and the second cloud storage service in February to August are created on the basis of the history of usages of the associated services by the target user in the individual months. The bar graphs indicating the estimated usages of the first cloud storage service and the second cloud storage service for September are created in accordance with the basic estimated usages calculated in step S17 described above or the advanced estimated usages calculated in step S21 described above. Because the document management service is not used before September, no bar graph indicating a usage before September is displayed, and only a bar graph indicating an estimated usage for September is displayed. The bar graph indicating the estimated usage of the new service for September is created in accordance with the estimated usage calculated in step S23 described above.

Figure 8:
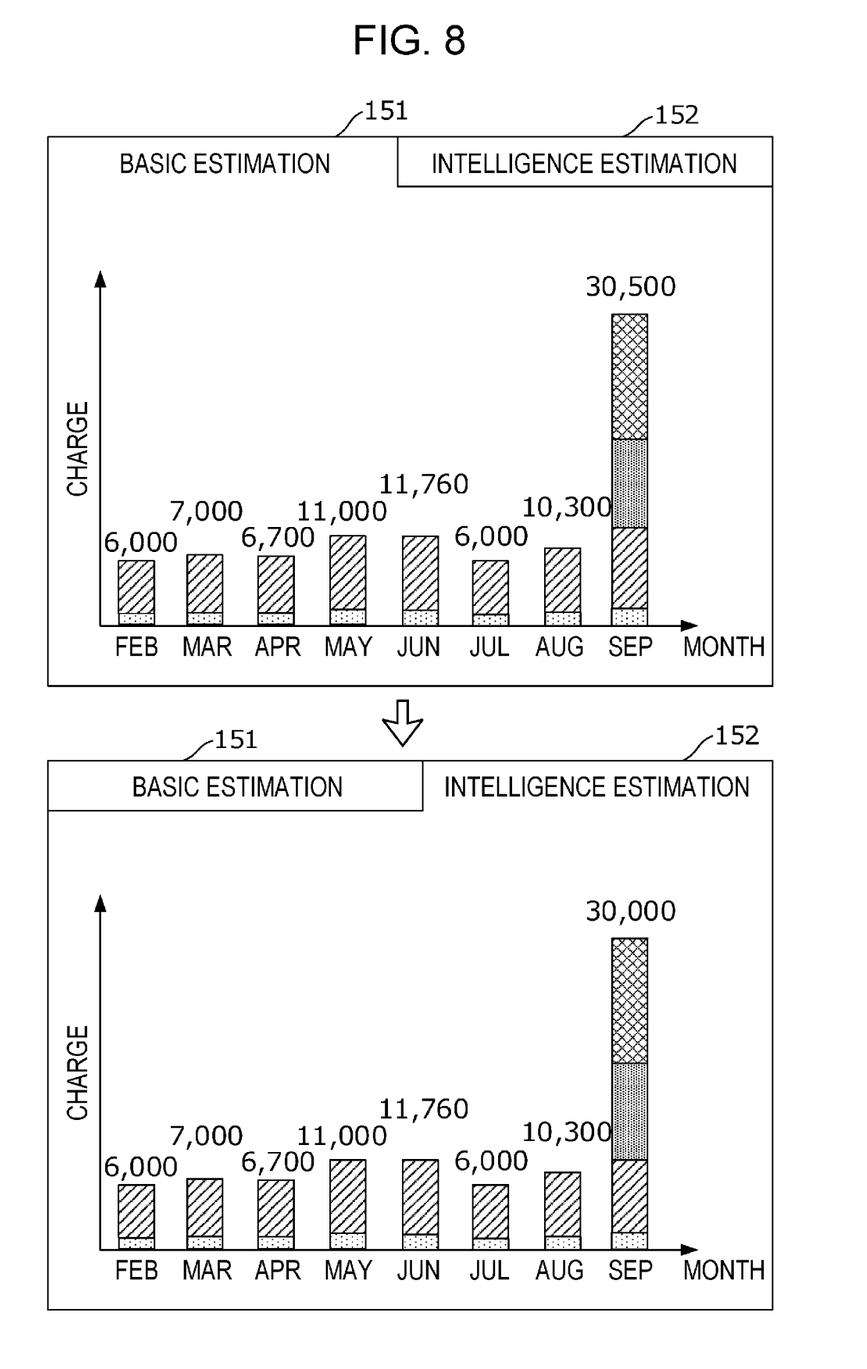
FIG. 8 is a diagram illustrating an example of estimated charges displayed on the display unit.

FIG. 8 is a diagram illustrating an example of estimated charges displayed on the display unit 122. In this example, cumulative bar graphs indicating the actual charges for individual services in February to August and a cumulative bar graph indicating the estimated charges for the individual services for September are displayed. The cumulative bar graphs indicating the actual charges for the individual services in February to August are created in accordance with charges calculated on the basis of the history of the usages of the first cloud storage service and the second cloud storage service by the target user in the individual months. The cumulative bar graph indicating the estimated charges for the individual services for September is created in accordance with the estimated charge for the product version of the scan service set, the estimated charge for the first cloud storage service, the estimated charge for the second cloud storage service, and the estimated charge for the document management service that are calculated in step S24 described above. Furthermore, the sum of the charges or the estimated charges for a month is displayed above the bar graph for the corresponding month.

Furthermore, on the screens for estimated charges illustrated in FIG. 8, a tab 151 and a tab 152 are provided. In the case where the tab 151 is selected, the estimated charges calculated in accordance with the basic estimated usages calculated in step S17 described above are used as the estimated charge for the first cloud storage service and the estimated charge for the second cloud storage service for September. In contrast, in the case where an administrator performs an operation using the operation unit 121 for selecting the tab 152, the screen is switched in accordance with the operation. On the switched screen, the advanced estimated charges calculated in step S21 described above are used as the estimated charge for the first cloud storage service and the estimated charge for the second cloud storage service for September. Furthermore, in the case where there are a plurality of similar users, switching to display of a plurality of estimated charges corresponding to usages of the similar users may be performed in accordance with an operation by the administrator using the operation unit 121. In this case, use information of the individual similar users may be displayed.

In step S27, the terminal apparatus 120 determines whether or not a use condition has been changed. For example, in the case where an operation for changing a use condition is performed after the input screen displayed in step S11 described above is displayed again in accordance with an operation by the administrator using the operation unit 121, the result of the determination in step S27 is YES, and the process proceeds to step S28.

In step S28, the terminal apparatus 120 transmits the changed use condition to the server apparatus 130. The communication unit 133 of the server apparatus 130 receives the changed use condition transmitted from the terminal apparatus 120. The processor 131 acquires the changed use condition. When acquiring the changed use condition, the process returns to step S14 described above, and the processing of step S14 and later steps is performed in accordance with the changed use condition. Accordingly, the estimated usage of the target service is changed in accordance with the change of the use condition. Furthermore, the estimated usage of the associated service and the estimated usage of the new service are changed in accordance with the changed estimated usage of the target service. Moreover, when the estimated usages are changed as described above, the estimated charges are changed in accordance with the changed estimated usages. Then, the changed estimated usages and estimated charges are transmitted from the server apparatus 130 to the terminal apparatus 120 and are displayed on the terminal apparatus 120.

In contrast, in the case where the use condition is not changed in step S27 described above, the result of the determination in step S27 is NO, and the process skips step S28 and proceeds to step S29. In step S29, when the administrator performs an operation using the operation unit 121 for confirming purchase of the product version of the target service, the terminal apparatus 120 transmits confirmation information to the server apparatus 130 in accordance with the operation. The confirmation information includes the last use condition set. The communication unit 133 of the server apparatus 130 receives the confirmation information transmitted from the terminal apparatus 120.

In step S30, the processor 131 of the server apparatus 130 performs processing for switching the target service for the target user from the trial version to the product version in accordance with the confirmation information. Accordingly, the target user becomes able to use the product version of the target service. Furthermore, in the case where the product version of the new service is added, the processor 131 of the server apparatus 130 performs processing for issuing a license of the product version of the new service to the target user. Accordingly, the target user becomes able to use the product version of the new service.

According to an exemplary embodiment described above, the estimated usage of the associated service that is associated with the target service is calculated, and the estimated charge is calculated in accordance with the estimated usage of the associated service. Thus, compared to the case where it is assumed that there is no change in the usage of the associated service that is associated with the target service between before and after the target service is switched from the trial version to the product version, the accuracy of the estimated charges for the target service and the associated service during the unit period after the target service is switched to the product version is increased.

Furthermore, the relationship definition table 137 is generated on the basis of the relationship between the usage of the target service and the amount of change in the usage of the associated service determined in advance in accordance with contents of the target service and contents of the associated service. Thus, compared to the case where the relationship between the usage of the target service and the amount of change in the usage of the associated service is defined irrespective of the contents of the target service and the associated service, the accuracy of the estimated charges for the target service and the associated service is increased.

Furthermore, in the case where the ratio of the amount of change in the usage of the associated service to the usage of the target service is calculated on the basis of the history of usage of a different user, the accuracy of the estimated charges for the target service and the associated service is increased compared to the case where the ratio of the amount of change in the usage of the associated service to the usage of the target service is defined irrespective of the history of the usage of the different user.

Furthermore, in the case where the advance estimated usage of the associated service is calculated using the ratio calculated on the basis of the history of usage by the similar user, the accuracy of the estimated charges for the target service and the associated service is increased compared to the case where the estimated usage of the associated service is calculated using the ratio calculated on the basis of the history of usage of another user different from the similar user.

Furthermore, the estimated usage of the target service is calculated in accordance with a use condition for the product version of the target service. Thus, in the case where the use condition for the target service changes at the switching to the product version, the accuracy of the estimated charges for the target service and the associated service is increased compared to the case where the estimated usage of the target service is calculated in accordance with a use condition for the trial version.

Furthermore, in the case where a use condition is changed, an estimated usage and an estimated charge are calculated again in accordance with the changed use condition. Thus, the estimated usage of the target service that reflects contents of the change of the use condition is obtained. Furthermore, the recalculated estimated usage and estimated charge are displayed. Thus, the user is able to recognize changes in the estimated charges for the target service and the associated service corresponding to the change in the use condition.

Furthermore, in the case where the estimated usage of the target service is calculated on the basis of history of usage of the target service by a different user, the estimated usage of the target service that reflects the usage of the target service by the different user is obtained.

Furthermore, an estimated usage and an estimated charge for a new service are calculated on the basis of the estimated usage of the target service. Thus, even in the case where the new service associated with the target service starts to be used at the switching of the target service from the trial version to the product version, the accuracy of the estimated charge for the new service during the unit period after the target service is switched from the trial version to the product version is increased compared to the case where the estimated usage of the new service is calculated irrespective of the usage of the target service.

3. Modifications

Exemplary embodiments described above are examples of the present disclosure. The present disclosure is not limited to the exemplary embodiments described above. The exemplary embodiments described above may be modified as described below. Two or more modifications may be combined together.

In an exemplary embodiment described above, the ratio of the amount of change in the usage of the associated service to the usage of the trial version of the target service may be calculated using the history of usages by all users instead of using the history of usage by the similar user. Furthermore, the calculated ratio may be stored in the relationship definition table 137.

In an exemplary embodiment described above, the estimated usage of the target service may be calculated on the basis of the history of usage by the similar user. For example, regarding the estimated usage of the target service, the usage of the target service by the similar user is acquired from the use history 136 stored in the storing unit 134. Then, the number of licenses of the target service used by the similar user is acquired from the user information 138 stored in the storing unit 134. By using the usage of the target service by the similar user and the number of licenses of the target service by the similar user, instead of the usages of the target service by all the users and the number of licenses of the target service by all the users, in Equation (2) mentioned above, the estimated usage of the target service is calculated.

In an exemplary embodiment described above, in accordance with a method similar to the method for calculating the ratio of the amount of change in the usage of the associated service to the usage of the trial version of the target service, the ratio of the amount of change in the usage of the associated service to the usage of the trial version of the target service may be calculated on the basis of the history of usage by the similar user.

In an exemplary embodiment described above, in the case where an option is added at the switching from the trial version to the product version of the target service, the estimated usage of the target service may be calculated taking into consideration the usages of the option by all the users. Some trial versions have limited extensions. For example, the product version of the scan service set includes the service called "scan to cloud". However, the trial version of the scan service set may not include the service called "scan to cloud". In this case, at the switching from the trial version to the product version, the service called "scan to cloud" may be added as an option. For example, the estimated usage may be calculated on the basis of the average usage of the option per unit period by all the users in accordance with the number of licenses of the option added to the product version of the target service. For example, in the case where the number of licenses of the option added to the product version of the target service is 10 users and the average usage of the option per unit period by all the users is 100 pages, the estimated usage of the added option is 1,000 pages (=10 users×100 pages). In this case, a result obtained by adding 1,000 pages to the estimated usage calculated in step S14 described above may be used as the estimated usage of the target service.

In an exemplary embodiment described above, in the case where an option is deleted at the switching of the target service from the trial version to the product version, usage of the option may be subtracted from the estimated usage of the target service. Furthermore, in the case where use of at least part of the associated service is stopped at the switching of the target service from the trial version to the product version, usage of the corresponding part may be subtracted from the estimated usage of the associated service.

In an exemplary embodiment described above, in the case where there are a plurality of associated services having similar functions, such as the first cloud storage service and the second cloud storage service, the proportion of the amounts of change in the usages of the plurality of associated services may be calculated on the basis of the history of usages of all the users. For example, in the case where all the users use the first cloud storage service and the second cloud storage service at the proportion of 5:5, the proportion of the amounts of change in the usages of the first cloud storage service and the second cloud storage service may be 5:5. Furthermore, the history of usage by the similar user may be used instead of the history of usages of all the users.

In an exemplary embodiment described above, in the case where the number of licenses changes at the switching of the target service from the trial version to the product version, the estimated usage changes according to the number of licenses. However, an element that changes the estimated usage is not limited to the number of licenses. For example, the estimated usage may be changed in accordance with the number of client apparatuses 110 or the data capacity handled in the service.

In an exemplary embodiment described above, more restrictions may be imposed on functions in the trial version than the product version. In this case, when the target service is switched from the trial version to the product version, the usage of the target service may increase as the restrictions on the functions are removed. In this case, the estimated usage of a function with restriction removed may be added to the estimated usage of the target service.

In an exemplary embodiment described above, both the basic estimated usage and the advanced estimated usage are calculated as the estimated usage of the associated service. However, both the estimated usages are not necessarily calculated. For example, only one of the estimated usages may be calculated.

In an exemplary embodiment described above, only the estimated usage of the product version of the target service may be displayed. The estimated usage of the associated service or the estimated usage of the new service may not be displayed. For example, when the estimated usage of the product version of the target service is calculated in step S14 described above, the estimated usage may be transmitted to and displayed on the terminal apparatus 120.

In an exemplary embodiment described above, the server apparatus 130 may transmit information indicating an estimated usage and an estimated charge, instead of the estimated usage and the estimated charge. For example, the processor 131 may generate display data to be displayed on the screens illustrated in FIGS. 7 and 8 and transmit the generated display data to the terminal apparatus 120.

In an exemplary embodiment described above, the client apparatus 110 is not necessarily an image processing apparatus. The client apparatus 110 may be any apparatus as long as the apparatus is used for providing a service. A service provided using the client apparatus 110 is not limited to a service using a function for processing an image. The service provided using the client apparatus 110 may be any service as long as the service is provided using the client apparatus 110.

In an exemplary embodiment described above, a subject of a process performed at the service providing system 100 is not limited to the example illustrated in FIG. 6. For example, at least part of a process performed by the server apparatus 130 may be performed by the terminal apparatus 120 or another apparatus.

In an exemplary embodiment described above, the configuration of the service providing system 100 is not limited to the example illustrated in FIG. 1. Apart from the server apparatus 130, a collection apparatus that collects the use history 136 from the client apparatus 110 may be provided, and the use history 136 may be stored in the collection apparatus in place of the server apparatus 130.

An exemplary embodiment of the present disclosure may be provided as a program to be executed by the server apparatus 130. The server apparatus 130 is an example of a computer according to an exemplary embodiment of the present disclosure. The program may be downloaded via a communication line such as the Internet or may be recorded in a computer-readable recording medium such as a magnetic recording medium (a magnetic tape, a magnetic disk, etc.), an optical recording medium (an optical disc etc.), a magneto-optical recording medium, or a semiconductor memory and provided.

In an exemplary embodiment described above, services may include a flat-rate billing service or a billing service of a combination of pay-as-you-go and flat-rate billing. For the flat-rate billing service, a predetermined charge for the service is an estimated charge, irrespective of the actual usage. For the billing service of the combination of pay-as-you-go and flat-rate billing, for example, an estimated charge is obtained by adding a charge corresponding to at least part of an estimated charge to a charge determined in advance for the service.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire a first usage of a first service by a user and a second usage of a second service in a first use mode in which the second service is trialed for free of charge by the user, the second service being associated with the first service,
calculate, using the first usage and an amount of change in the usage of the first service, a first estimated usage of the first service by the user during a period after switching from the first use mode to a second use mode in which the second service is used for charge, the amount of change corresponding to use of the second service and being obtained based on the second usage in accordance with a defined relationship, and
output information indicating a first estimated charge for the first service during the period and a second estimated charge for the second service during the period, the first estimated charge corresponding to the first estimated usage, the second estimated charge corresponding to the second usage.

2. The information processing apparatus according to claim 1, wherein the relationship is defined in advance in accordance with contents of the first service and contents of the second service.

3. The information processing apparatus according to claim 2,
wherein the processor is configured to
acquire, in a case where a use condition for the second service is changed by the user at the switching from the first use mode to the second use mode, the changed use condition, and
calculate a second estimated usage of the second service during the period under the changed use condition, and
wherein the amount of change is obtained based on the second estimated usage in accordance with the defined relationship.

4. The information processing apparatus according to claim 3, wherein the processor is configured to calculate the second estimated usage based on the second usage in accordance with the changed use condition.

5. The information processing apparatus according to claim 3,
wherein the use condition is a first use condition, and
wherein the processor is configured to acquire a second use condition and history of usages of the second service by a different user, and
calculate the second estimated usage based on the history of the usages by the different user in accordance with a relationship between the first use condition and the second use condition.

6. The information processing apparatus according to claim 3, wherein the processor is configured to
change, in a case where a use condition for the second service is changed after the first estimated charge and the second estimated charge are output, the second estimated usage in accordance with the change of the use condition,
change the first estimated usage in accordance with the changed second estimated usage, changes the first estimated charge and the second estimated charge in accordance with the changed first estimated usage and the changed second estimated usage, and
output the changed first estimated charge and the changed second estimated charge.

7. The information processing apparatus according to claim 1, wherein the processor is configured to
acquire history of usages of the first service and the second service by at least one different user, and
define the relationship based on the history of the usages.

8. The information processing apparatus according to claim 7, wherein the processor is configured to
acquire first use information indicating use statuses of a plurality of services including the first service and the second service by the user and second use information indicating use statuses of the plurality of services by the at least one different user,
determine, in accordance with the first use information and the second use information, a reference person whose similarity in use status with the user is equal to or more than a threshold, out of the at least one different user,
acquire history of usages of the first service and the second service by the reference person, and
define the relationship based on the history of the usages by the reference person.

9. The information processing apparatus according to claim 8,
wherein the processor is configured to
acquire, in a case where a use condition for the second service is changed by the user at the switching from the first use mode to the second use mode, the changed use condition, and
calculate a second estimated usage of the second service during the period under the changed use condition, and
wherein the amount of change is obtained based on the second estimated usage in accordance with the defined relationship.

10. The information processing apparatus according to claim 9, wherein the processor is configured to calculate the second estimated usage based on the second usage in accordance with the changed use condition.

11. The information processing apparatus according to claim 9,
wherein the use condition is a first use condition, and
wherein the processor is configured to
acquire a second use condition and history of usages of the second service by a different user, and
calculate the second estimated usage based on the history of the usages by the different user in accordance with a relationship between the first use condition and the second use condition.

12. The information processing apparatus according to claim 7,
wherein the processor is configured to
acquire, in a case where a use condition for the second service is changed by the user at the switching from the first use mode to the second use mode, the changed use condition, and
calculate a second estimated usage of the second service during the period under the changed use condition, and
wherein the amount of change is obtained based on the second estimated usage in accordance with the defined relationship.

13. The information processing apparatus according to claim 12, wherein the processor is configured to calculate the second estimated usage based on the second usage in accordance with the changed use condition.

14. The information processing apparatus according to claim 12,
wherein the use condition is a first use condition, and
wherein the processor is configured to
acquire a second use condition and history of usages of the second service by a different user, and
calculate the second estimated usage based on the history of the usages by the different user in accordance with a relationship between the first use condition and the second use condition.

15. The information processing apparatus according to claim 1,
wherein the processor is configured to
acquire, in a case where a use condition for the second service is changed by the user at the switching from the first use mode to the second use mode, the changed use condition, and
calculate a second estimated usage of the second service during the period under the changed use condition, and
wherein the amount of change is obtained based on the second estimated usage in accordance with the defined relationship.

16. The information processing apparatus according to claim 15, wherein the processor is configured to calculate the second estimated usage based on the second usage in accordance with the changed use condition.

17. The information processing apparatus according to claim 15,
wherein the use condition is a first use condition, and
wherein the processor is configured to
acquire a second use condition and history of usages of the second service by a different user, and
calculate the second estimated usage based on the history of the usages by the different user in accordance with a relationship between the first use condition and the second use condition.

18. The information processing apparatus according to claim 15, wherein the processor is configured to
change, in a case where a use condition for the second service is changed after the first estimated charge and the second estimated charge are output, the second estimated usage in accordance with the change of the use condition,
change the first estimated usage in accordance with the changed second estimated usage,
change the first estimated charge and the second estimated charge in accordance with the changed first estimated usage and the changed second estimated usage, and
output the changed first estimated charge and the changed second estimated charge.

19. The information processing apparatus according to claim 1,
wherein the defined relationship is a first relationship,
wherein in a case where a third service associated with the second service starts to be used by the user at the switching from the first use mode to the second use mode, the processor calculates a third estimated usage of the third service by the user during the period, the third estimated usage being obtained based on the second usage and in accordance with a defined second relationship, and
wherein the information indicates a third estimated charge for the third service during the period, the third estimated charge corresponding to the third estimated usage.

20. A non-transitory computer readable medium storing a program causing a computer to execute a process for information processing, the process comprising:
- acquiring a first usage of a first service by a user and a second usage of a second service in a first use mode in which the second service is trialed for free of charge by the user, the second service being associated with the first service;
- calculating, using the first usage and an amount of change in the usage of the first service, a first estimated usage of the first service by the user during a period after switching from the first use mode to a second use mode in which the second service is used for charge, the amount of change corresponding to use of the second service and being obtained based on the second usage in accordance with a defined relationship; and
- outputting information indicating a first estimated charge for the first service during the period and a second estimated charge for the second service during the period, the first estimated charge corresponding to the first estimated usage, the second estimated charge corresponding to the second usage.

* * * * *